United States Patent
Braeger et al.

(10) Patent No.: US 7,090,574 B2
(45) Date of Patent: Aug. 15, 2006

(54) METHOD AND DEVICE FOR FILLETING KILLED AND HEADLESS FISH, THE ABDOMINAL CAVITY OF WHICH IS OPENED UP

(75) Inventors: Horst Herbert Braeger, Lübeck (DE); Wolfgang Möller, Lübeck (DE); Dirk Schmüser, Sereetz (DE)

(73) Assignee: Nordischer Maschinenbau Rud. Baader GmbH + CO KG, Lubeck (DE)

( * ) Notice: Subject to any disclaimer, the term of this patent is extended or adjusted under 35 U.S.C. 154(b) by 122 days.

(21) Appl. No.: 10/332,520

(22) PCT Filed: Jul. 11, 2001

(86) PCT No.: PCT/EP01/08003

§ 371 (c)(1),
(2), (4) Date: Jan. 10, 2003

(87) PCT Pub. No.: WO02/03807

PCT Pub. Date: Jan. 17, 2002

(65) Prior Publication Data

US 2004/0253915 A1      Dec. 16, 2004

(30) Foreign Application Priority Data

Jul. 11, 2000  (DE) ................ 100349366
Aug. 14, 2000  (DE) ............... 200142119 U

(51) Int. Cl.
A22C 25/16  (2006.01)
(52) U.S. Cl. .................. 452/162; 452/161
(58) Field of Classification Search ........... 452/150, 452/155, 160, 161, 162, 163, 164
See application file for complete search history.

(56) References Cited

U.S. PATENT DOCUMENTS

| | | | | |
|---|---|---|---|---|
| 3,319,287 A | * | 5/1967 | Michael | 452/135 |
| 4,008,509 A | * | 2/1977 | Braeger et al. | 452/135 |
| 4,037,294 A | * | 7/1977 | Cowie et al. | 452/136 |
| 4,084,294 A | * | 4/1978 | Dohrendorf | 452/135 |
| 4,336,634 A | | 6/1982 | Braeger | |
| 4,649,604 A | * | 3/1987 | Braeger | 452/127 |
| 4,688,297 A | * | 8/1987 | Bartels | 452/135 |
| 4,748,723 A | * | 6/1988 | Braeger et al. | 452/122 |
| 5,413,525 A | * | 5/1995 | Braeger et al. | 452/165 |
| 5,536,205 A | * | 7/1996 | Braeger et al. | 452/161 |

FOREIGN PATENT DOCUMENTS

DE         1 454 089         3/1964

(Continued)

*Primary Examiner*—Jeffrey L. Gellner
*Assistant Examiner*—David J. Parsley
(74) *Attorney, Agent, or Firm*—Mattingly, Stanger, Malur & Brundidge, P.C.

(57) ABSTRACT

Certain farmed and/or breeding fish such as tilapia are filleted after the fish have been beheaded, slaughtered and had their ventral cavity opened. Cuts are made in the dorsal region and on the ventral side in the caudal region for exposing the dorsal spokes and ventral spokes, respectively. Then, separating cuts are made over the vertebral column connecting the dorsal and ventral cuts. Before peeling separation in the region of the ventral cavity, the ventral lobes are trimmed by separation of the ends of their ventral lobe portions projecting beyond the ribs. Peeling separation is completed by peeling cuts adapted to the rib contour and made with at least two degrees of freedom.

15 Claims, 8 Drawing Sheets

| | FOREIGN PATENT DOCUMENTS | | | EP | 771 530 | | 11/1995 |
|---|---|---|---|---|---|---|---|
| DE | 29 12 982 | 3/1979 | | GB | 2193079 | * | 2/1988 |
| DE | 29 46 042 | 11/1979 | | JP | 2-211851 | * | 8/1990 |
| DE | 34 03 771 | 2/1984 | | JP | 4-222547 | * | 8/1992 |
| DE | 35 18 960 | 5/1985 | | | | | |

* cited by examiner

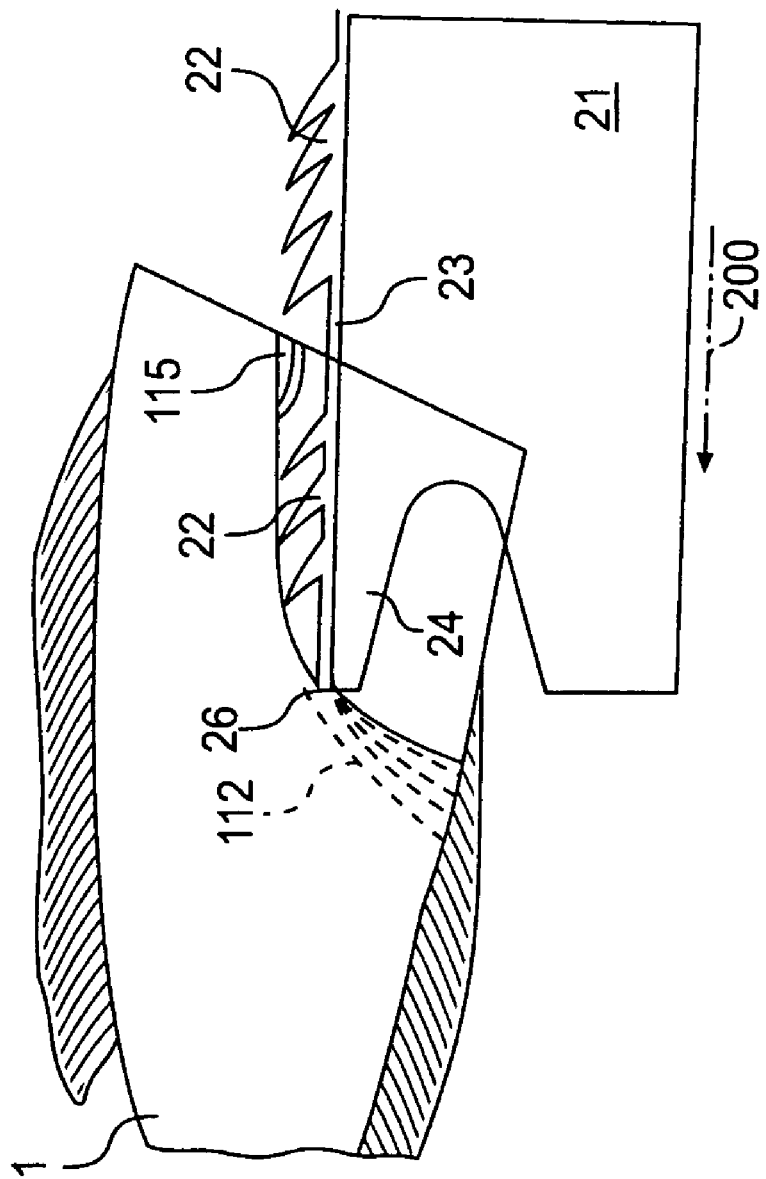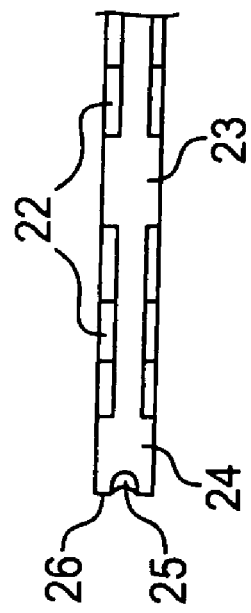
FIG. 3A
FIG. 3B

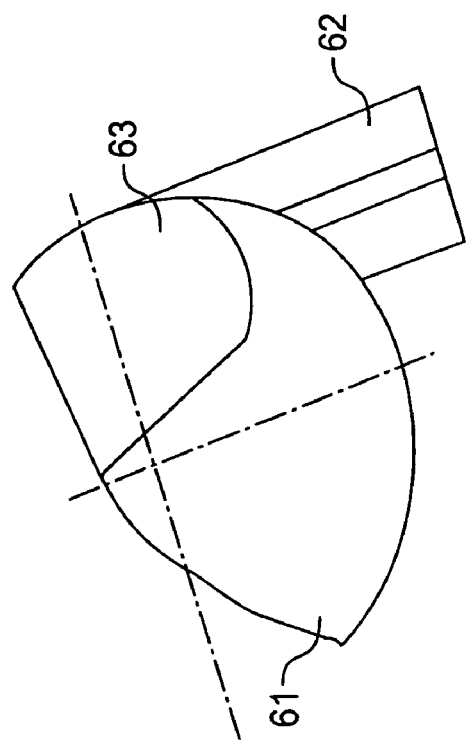
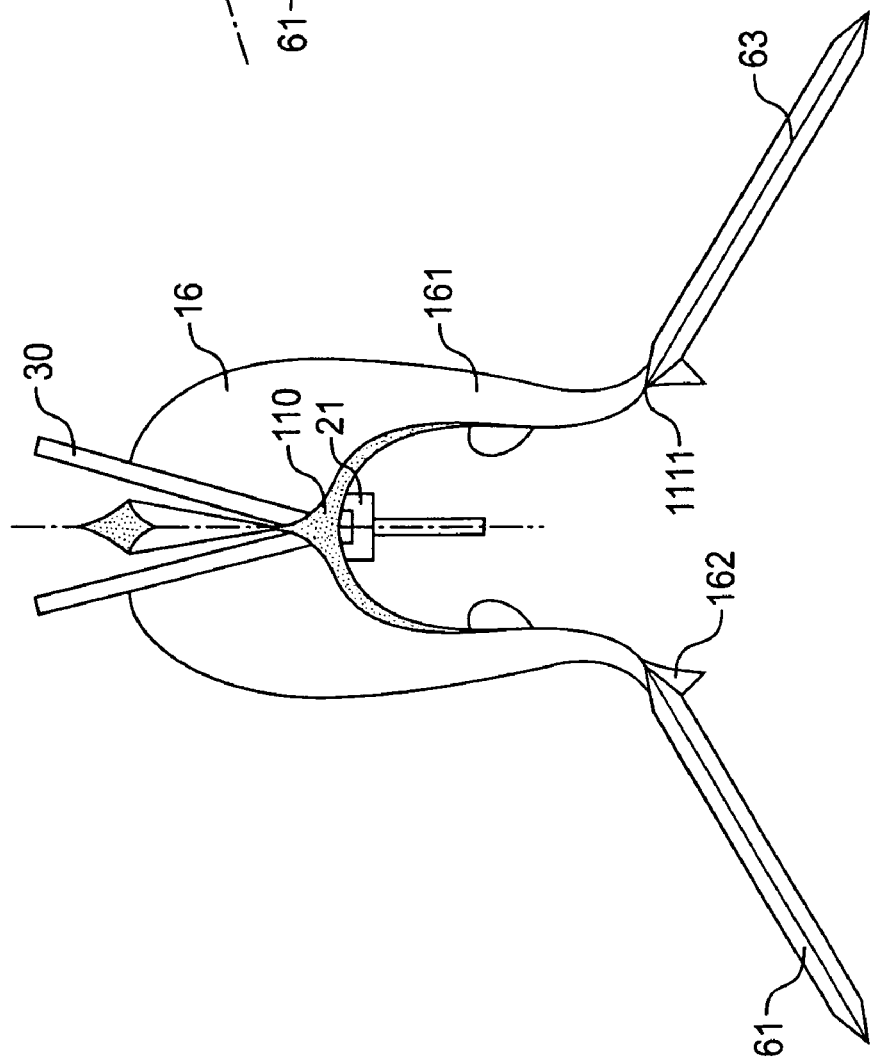
FIG. 6B
FIG. 6A

METHOD AND DEVICE FOR FILLETING KILLED AND HEADLESS FISH, THE ABDOMINAL CAVITY OF WHICH IS OPENED UP

BACKGROUND OF THE INVENTION

1. Field of the Invention

The invention concerns a method for filleting fish which have been beheaded, slaughtered and had their ventral cavity opened, in particular in the large-scale processing of breeding fish, especially of the species tilapia, wherein the fillets are detached from the bone structure in the dorsal region by means of dorsal cuts which are made as far as the vertebral column and expose the dorsal spokes/radialia and on the ventral side on the one hand in the caudal region by means of ventral cuts which are made as far as the vertebral column and expose the ventral or belly spokes/radialia as well as separating cuts which are made over the vertebral column and connect the dorsal and ventral cuts and on the other hand by means of scraping or peeling separation which under laterally yielding counter-pressure is effected from the vertebral column along the ribs surrounding the ventral cavity. Further, the invention concerns a corresponding filleting apparatus, including dorsal blades for exposing the dorsal spokes up to the vertebral column; ventral blades for exposing the ventral spokes in the caudal region up to the vertebral column; separating blades for separating the fillets in the caudal region from the vertebral column, cutting through the ridge left by ventral and dorsal blades around the vertebral column, i.e. on both sides thereof; a scraping tool including peeling blades and peeling blade supports for scraping/peeling separation of the fillets from the ribs surrounding the ventral cavity under laterally yielding counterpressure from the vertebral column; an endless conveyor for transport of the fish tail first and past the aforementioned tools arranged on both sides of an imaginary conveying plane and also a number of fish saddles arranged on the conveyor for reliably holding the fish in their ventral cavity for the purpose of transport and processing with the tools.

2. Description of the Related Art

A method and apparatus of this kind are basically known from DE-A1 14 54 089. In the known apparatus, in addition to the ventral filleting and dorsal filleting and separating blades for cutting the ribs free which are basically known in the field of fish filleting, there is provided a scraping tool which with its cutting edge scrapes directly over the surface of the ribs or vertebral processes, so that compared with previously known rigid rib blades in this area no more fillet flesh remains on the bone structure and the yield can be improved. When using such scraping tools, compared with apparatuses with rigid circular rib blades such as were used for decades before, it is necessary to advance the separating cut for separating the strips of flesh left at the sides of the spine after the ventral and dorsal filleting cuts, to before the rib cut, because the scraping blade located rigidly in the plane of the lower edges of the dorsal guides pushes the fillet off the ribs or vertebral processes as a result of its plough-like action. But for this the fillet must be completely detached in the caudal region.

However, with such a cutting sequence it turned out that, due to the upsetting forces acting on the fillets in this region, irregularities arise in cut guiding and impair the filleting result in quality and yield. Furthermore it is not possible to ensure that the separated fillets can always be discharged in a definite position, for example lying flat on the skin side, which was and is a precondition for automatic further processing without problems, e.g. skinning.

To remedy these drawbacks the apparatus known from DE-B 1 29 46 042 was developed, in which the scraping tool is designed with a scraping blade arranged one on either side of ventral and dorsal guides and beginning adjacent to the latter in a point, with cutting edge diverging in a wedge shape, and with a bead-like support which is allocated to the cutting edge and forms a gap with it and which also starts from a point adjacent to the ventral guide and laterally yields resiliently relative to the scraping blade. In this case the scraping tool is vertically displaceable in such a way that shortly before arrival of the ventral cavity end of the fish each scraping blade is movable at least with its point out of a position below the upper edge of the ventral guides into the vicinity of the lower edges of the dorsal guides, and each support is also movable with at least its point out of a position in the region of the ventral guides into the vicinity of the upper edges thereof. Thus the fillets are subjected to the scraping forces as a result of the connection to the skeleton in the elongate state which is still preserved after application of the ventral and dorsal filleting cuts and extends as far as the root of the tail, which leads to a much smoother cut surface and correspondingly improved yield. Also, as a result of complete release of the fillets not taking place until after the scraping process by means of the separating cuts, the fillets can be deposited in the correct position for automatic further processing.

This known machine works largely satisfactorily for different fish species such as rosefish, tuna and fish to be allocated to the salmon family with, unlike the Gadidae such as pollock, cod, etc., the upper wall of the ventral cavity passing directly towards the anus. It was therefore attempted to use and adapt such apparatuses and methods for other fish species too, particularly tilapia, a farmed and/or breeding fish with a body shape and basic bone structure similar to the rosefish. However, this did not lead to satisfactory filleting results, because on the one hand with the tilapia species there are qualitatively important deviations from the "normal" bone structure and the usual structure of the ventral cavity to an uncommonly high degree in total, so that a universal application of the known machine referred to this fish is not possible. Thus the tilapia exhibits markedly strong, curved flank bones which do not allow "smoothing" by the known scraping tool or allow it only to an extremely limited extent, because this tool essentially forms with the (vertical) conveying plane an angle of 90°, that is, stretches the ribs in the two tool portions practically over 180°. Hence there are losses of flesh. Further, with this fish species the rib or flank bones are attached relatively loosely to the main body, which with the traditional peeling or scraping operation or the apparatuses used for this would easily result in these bones being torn off from the main body/bone structure and consequently remaining in the fillet and so result in a lower-quality product. Also in the ventral cavity region below the flank bones on either side there is an inner protuberance essentially consisting of fatty tissue. Between these two protuberances extends a corium-like connection for division or separation between ventral cavity and swim bladder. In other words, unlike the above-mentioned ordinary fish which have a two-part swim bladder in the upper region of the ventral cavity on both sides of the spine/vertebral column, the tilapia has a one-part, very large swim bladder which poses considerable problems for processing on traditional machines.

BRIEF SUMMARY OF THE INVENTION

It is therefore the main aim of the invention to provide a method and an apparatus with which, avoiding the drawbacks described for the known measures, processing especially of fish of the tilapia species is possible.

It is another aim of the invention to enable the production of clean fillets with minimal use of personnel with a high throughput. This is to be effected with maximum possible yield.

This object is achieved in the method of the kind described hereinbefore by the fact that before peeling separation in the region of the ventral cavity the ventral lobes are trimmed by separation of the ends of their ventral lobe portions projecting beyond the ribs and then peeling separation is completed by scraping or peeling cuts adapted to the rib contour and made with at least two degrees of freedom.

In the apparatus, to achieve the object it is provided that the scraping tool/peeling blades are both pivotable with lateral spring yielding about an axis running essentially perpendicularly to the conveying plane and pivotable away from the conveying plane against spring force about a hinge axis running essentially in the direction of the scraping or peeling edges and optionally in front of the scraping tool or in the region thereof is arranged a trimming device for trimming the ventral lobes in the region of the ventral cavity by at least partial separation of the ends of their ventral lobe portions projecting beyond the ribs, from the fillets covered with the skin on the outside.

In this way on the one hand by means of trimming the condition of being able to detach the fillets cleanly from the bone structure by flank scraping in the tilapia in general is fulfilled. With this fish species, apart from the above-mentioned fatty protruberances located on the inside of the ventral cavity and mounting between them the leather-like membrane partition from the swim bladder, the end of the rib bones is connected to the outer skin, so that unclean edges would arise when scraping in this region. Hence there is removal of these ventral lobe portions which moreover become thicker again from the above-mentioned connecting point downwards, i.e. towards the end of the ventral cavity, and have an extremely high fat content, so that they are not considered for a high-quality saleable product, but can be subjected to a press sieving operation for example for subsequent fish meal recovery.

Trimming can be done before or after separation of the fillet flesh. Hence there are optionally various possibilities: on the one hand the ventral lobes can be trimmed and only then is the fish supplied to the scraping tool; but on the other hand any desired trimming, which then makes subsequent manual processing e.g. with respect to the pieces of skin superfluous, can also be performed concurrently with or following separation. In other words, superimposed processing or processing in reverse to the working sequence described above then takes place.

In subsequent trimming outside machine processing, traditionally as a rule the ventral lobes below the flank bones and/or skin attached thereto must be cut off by hand. Such labour-intensive operations can thus be saved according to the invention. Due to conduction of the peeling separation operation or peeling cuts according to the invention with two degrees of freedom and the lateral yielding capacity/pivotability of the peeling blades both vertically and away from the conveying plane, on the other hand the peeling cut is performed without disturbance by the protuberances while removing the latter from the fillet, that is, the through gap between blade and cutting support can be enlarged at the moment of traversing of this protuberance, without interrupting the continuity of the peeling or scraping operation. Also, due to the double lateral yielding capacity it is ensured that the peeling operation can be accomplished along the very rigid rib bones without pressing them flat as in conventional flank scraping, in a gentle manner in relation to the very loose attachment of the rib or flank bones to the main fish body. Hence there is no fear of the bones tearing off here and partially remaining in the fillet. Moreover the high flexibility of the scraping tool means generally improved capacity for use of the machine because easy, precise adaptation of the tool to the bone structure is enabled.

In a preferred development of the method it is provided that trimming is effected after lifting the ventral lobes under the cutting support by separation of the inner ventral skin as far as the end of the ribs at their point of connection to the outer skin. Hence clean separation of the unwanted ventral lobe portions is achieved with precision by guiding along the end of the rib or flank bones, i.e. at the point at which the outer skin is connected to them, wherein the trimming blades cut off the inner ventral skin from below towards the cutting support to exactly the end of the flank bones. For the apparatus, to attain this partial aim it is provided that the trimming device includes a pair of circular trimming blades and a cutting support allocated to each of them, so that the required precise trimming cut can be performed in a structurally simple manner.

However, as the tilapia has a tough to extremely resistant, leather-like skin, difficulties in making cuts frequently arise when trimming before peeling separation, by the fact that the skin is not completely cut through or not cut through at all. Then the following lower ventral lobe portions jam in the separating gap, and in the end the machine clogs. To counter this problem, it is further proposed by the invention to perform trimming after peeling separation. For this purpose the trimming device for trimming the ventral lobes can preferably be arranged in the region of the scraping tool, in such a way that the trimming cut is made from the inside of the fish through the ventral skin at the end of the ribs up to the outer skin or into it. As a result the ventral lobe portions then remain directly connected to the fillet, namely by the outer skin. Final separation can be done for example in a subsequent skinning operation. Additional, if necessary manual subsequent processing/trimming is not required in this case either.

To keep the stress on the relatively loose flank or rib bone connection to the main body as low as possible, according to another development concept of the invention peeling is to be effected at an angle of $\leq 10°$ to the perpendicular. With respect to the apparatus, for this purpose in an advantageous development of the invention the peeling blades can be designed as scraping blades arranged in pairs on both sides of the conveying plane with a scraping angle of $\leq 10°$ to the conveying plane and their cutting supports at least in the input region can be provided with a slender, slightly thickened upper edge, wherein here the cutting edges of the scraping blades project beyond the supports. In this way allowance is made for the relatively firm and highly curved structure of the flank bones. In connection with the lateral yielding capacity described for peeling blades and support there is a clean flank cut, wherein in the rear region of the cutting support the cutting edge of the scraping blade is covered, that is, for approx. 4 mm the cutting edge plunges away behind the support. This effect can be further improved by optionally providing inner or lower chamfers on the scraping or peeling blade. This particularly aids the fact that the peeling operation adapts satisfactorily to the contour of the bones, that is, their curvature in the ventral cavity region, and the scraping blade slides over them without being dragged into the bone structure.

A further peculiarity of fish of the species tilapia lies in that in the anal region and practically as the rear end of the ventral cavity they have a very strong anal bone which, when using normal saddles with convexly curved front edge and when uniformly fitting holding spikes along the saddle upper edge, usually arranged laterally in pairs, makes it impossible to saddle such fish reliably and definitely with respect to their position. With a conventional design of the front edge of the saddle, the fish would be pushed to one side by the stiff anal bone. Furthermore these fish have, seen from the anal opening in the direction of the head, a thicker main bone which also makes it impossible to saddle the fish on a regular spike assembly along the upper edges of the saddle and to hold them effectively by the spikes. To overcome these problems the fish saddles of the conveyor, when they are provided with a plurality of transport spikes which ensure reliable seating of the ventral cavity and at least partially penetrate the fish structure, are to be designed in such a way that from the front saddle end there are provided initially two to three transport spikes which are followed by a gap roughly corresponding to a spike division step and then, following on behind, additional spikes. Hence it is possible for the thicker main bone to be received on the upper edge of the saddle in this gap and moreover for the spikes of the upper edge of the saddle to continue, as known, to engage in the upper regions of the fish on or laterally of the main bone, in order to hold the fish fast. Furthermore, to prevent the rigid anal bone from being pushed aside, the saddles can in each case be designed with a slightly concave projection which ultimately receives this anal bone in it and so centres it rather than pushing it away to the side. If necessary this projection can be designed with a sharp front or upper edge, which facilitates penetration of the leather-like boundary membrane of the swim bladder and passing through it, so that in general the difficulties associated with this fish species due to its structural peculiarities when saddling the fish can be significantly reduced for the operating personnel.

Since both the dorsal fins and the ventral fins are relatively hard in the tilapia and cause difficulties regarding satisfactory insertion in case of ordinary, split dorsal and ventral inlet guides of scraping devices, which may lead to lateral yielding of the fish body and hence unusable cutting results, in a further development of the invention it is provided that the dorsal inlet guide can be provided as a closed angle profile, while the ventral inlet guides for introducing the ventral region of the fish into the filleting blades on the ventral side can be arranged as a double-mounted ventral inlet guide which is laterally yielding in two degrees of freedom.

Owing to the above-mentioned hard, thick dorsal fin, with the fish species tilapia there can also be losses of yield in the dorsal region if the dorsal blades are provided only slightly at an angle according to the prior-art apparatuses, forming between them an angle of up to 1.5°, i.e. 0.75° to the perpendicular, as is usual nowadays. To counter such drawbacks and achieve a better cutting yield, in an advantageous development the invention proposes that, instead, the dorsal blades arranged in pairs form between them an angle of approximately 2 to 6°, preferably one of essentially 4°. Due to the greater tilt, the cut is made under the dorsal fin so that an optimum flesh yield can be obtained in this region.

Further advantages and embodiments or possible designs of the invention are apparent from the description below of the practical examples shown in the schematic drawings.

BRIEF DESCRIPTION OF THE DRAWINGS

FIG. 3A is a sectional view of the fish when mounted with its ventral cavity on a transport saddle approximately at the level of line III—III of FIG. 2;

FIG. 3B is a top view of the transport saddle of FIG. 3A in a structural design according to the invention;

FIG. 6A is a cross-section through the fish when performing the trimming cut approximately in the section plane VI—VI in FIG. 2;

FIG. 6B is a top view of the trimming tool with cutting limit and blade cover;

DETAILED DESCRIPTION OF THE INVENTION

Figure 1A:
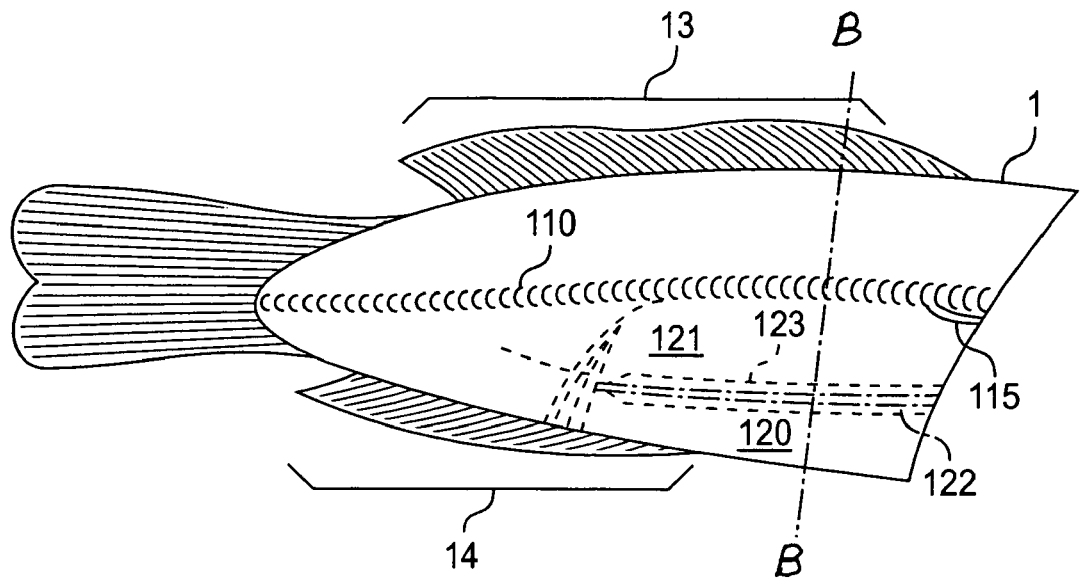
FIG. 1A is a fish body to be classed in the species tilapia, as it arrives for processing.

The fish intended for processing is in the form of a fish body 1 which has been beheaded, slaughtered and eviscerated and is open in the ventral cavity, as can be seen in FIGS. 1A and B. This is the body of a fish of the species tilapia with essentially the following properties: these fish have a relatively thick main bone 110, generally also referred to as the spine, from which, as can be seen in particular in FIG. 1C, a view of the skeleton or bone structure 11, dorsal bones 113 extend upwardly over the whole length of the fish and ventral bones 114 extend downwardly in the region in front of the caudal fin 15, while in the region of the ventral cavity 1curved around the latter, also starting from the spine 110, the flank or rib bones 111 extend. At the end of the ventral cavity, running from the spine 1to the anus, the fish of the tilapia species have a relatively compact and rigid anal bone 112 which extends towards the beginning of the ventral fins 14. These ventral fins are also, i.e. like the dorsal fins, markedly stiff and thick. Within the ventral cavity are located on either side, curving up from the insides of the ventral lobes, inner protuberances 123 which include fatty tissue and between which extends a dividing membrane 122 of leather-like character, shown in dot and dash lines here. This membrane 122 divides the ventral cavity into the actual lower ventral cavity region 1in which are located the digestive and other vital organs of the fish, and into an upper region which is occupied by a swim bladder 121 in one part in this species. At the beginning of this swim bladder on the head side the spine 1is provided with a thicker main bone portion 115 which, as is shown later, poses problems during normal saddling of the fish.

Figure 1B:
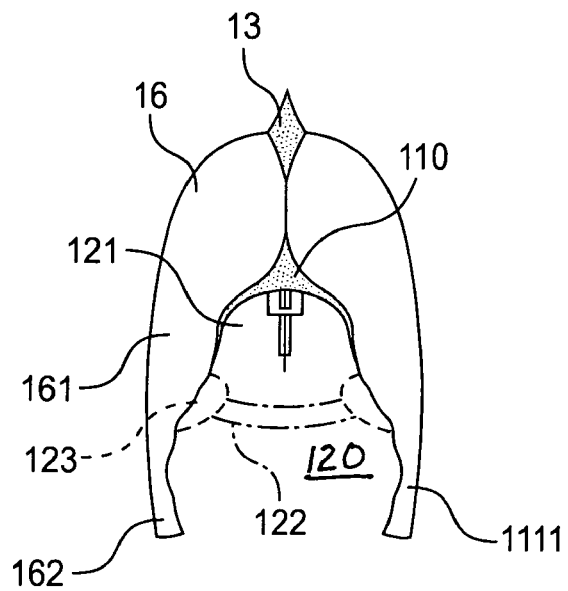
FIG. 1B is a cross-section through the fish body taken along line B—B of FIG. 1A.
Figure 1C:
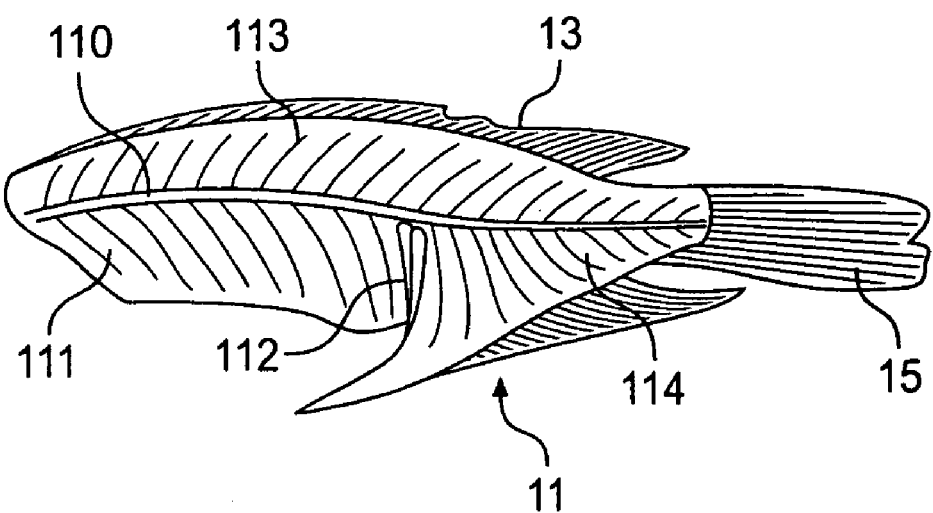
FIG. 1C shows the skeleton of the fish after processing of the fish body of FIG. 1A has taken place.

As can be seen from FIG. 1B, the flank bones 111 which are not shown in detail here extend as far as a location 1111 which is to be referred to as the rib end and at which the outer skin of the fish is practically joined to the rib ends. This location is, as can be seen, relatively thin. The ventral lobe widens again downwards, as can also be seen from FIG. 1B. As a result of this "predetermined break point" 1111, tearing off of the ventral lobe end portions 161 would be caused in this region during normal scraping filleting, also due to the relatively thick outer skin, which would lead to an aesthetically unattractive product.

Figure 2:
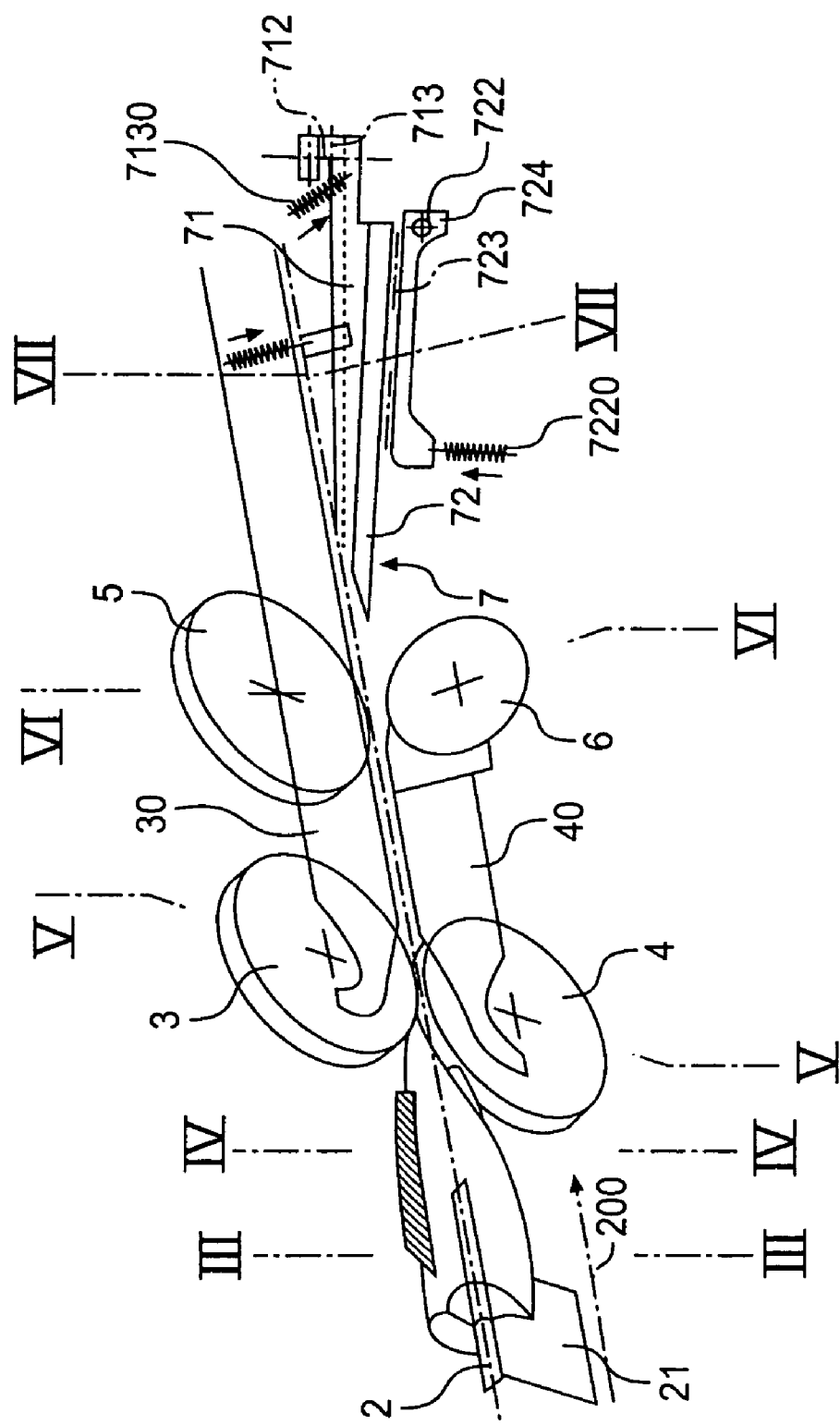
FIG. 2 is an axonometric view of the parts relevant to the invention of a filleting machine suitable for tilapia.

The apparatus shown in FIG. 2 serves to carry out the method according to the invention in fishes of the above-mentioned species. It includes an endlessly rotationally driven conveyor 2 not shown in more detail and indicated only by dot and dash lines, with fish saddles 21 on which the fish body 1 is firmly mounted, as is shown in FIG. 3A and will be described in more detail below, so that it is transported by the apparatus with a stable position and with the aid of additional guides can be processed into the primarily desired fillets 16 with a lower, secondary ventral lobe end portion 161 which is separated by trimming and which can be further processed e.g. by known press separating, as well as with a descending tertiary bone structure 11 with minor flesh residues adhering to it, also to be provided by press separating.

For this purpose there are provided in each case a conventional dorsal tool 3 as well as ventral tool 4, which each include circular blades 31 or 41 arranged in pairs. Adjoining the pair of dorsal blades 31 is a dorsal guide and adjoining the pair of ventral blades 41 is a ventral guide 40. With the dorsal tool 3 the dorsal bone 113 is cut free over the whole length of the fish as far as the vicinity of the spine 110, while the ventral bone 114 is cut free between caudal fin and end of the ventral cavity 120 by means of the ventral tool. Behind these two tools the above-mentioned dorsal and ventral guides or 40 then undertake guiding of the bone structure 11.

Figure 1D:
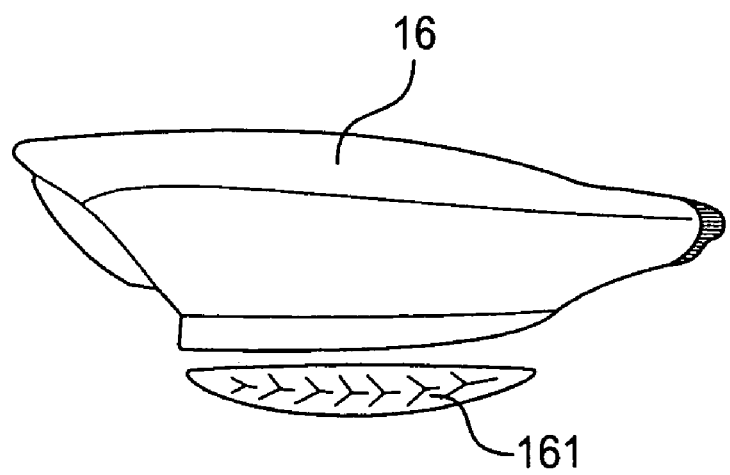
FIG. 1D shows the end fillet product with ventral lobe portion cut off by trimming.

To separate the fillets from the spine 110 in the region still cohering between the end of the ventral cavity 120 and caudal fin 15 there is provided a separating tool which cuts the fillets free from the bone structure by means of a pair of essentially parallel separating blades 51 over the main bone 110. On the ventral side is located a trimming tool 6, including a pair of trimming blades 61 set at an angle to each other, with which the lower ventral lobe portion 161 (FIG. 1D) is separated approximately along the end of the rib bones 111 in the region of the rib ends 1111. Both tools and 6 are provided as circular blades 51 or 61 arranged in pairs.

As the last processing tool, along the conveyor is arranged a scraping tool 7 which includes, also arranged in pairs, a peeling blade 71 as well as peeling blade supports 72.

Figure 8:
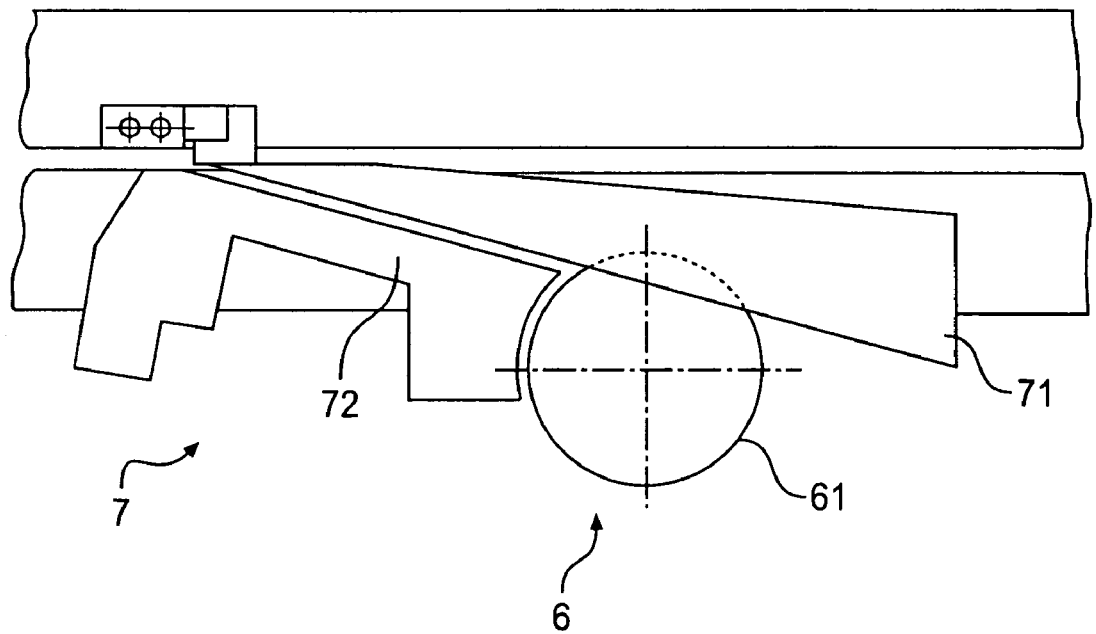
FIG. 8 is a side view of a further embodiment of the assembly of scraping tool and trimming device.

But appropriately an arrangement of the trimming device 6 in the operating or working region of the scraping tool 7 is also possible (see in particular FIG. 8).

For details not directly concerning the invention as such, reference is made for example to the above-mentioned DE 29 46 042 B1 which reflects the basic principle of a saddle-equipped conveyor with ventral, dorsal, separating and scraping tools, but is not, as already stated, suitable for the species tilapia. There can also be seen the basic position or basic path of the dorsal and ventral cuts in relation to the stationary strip of flesh laterally of the spine, which is cut through by means of the separating blades in the caudal region of the fish behind the ventral cavity.

The function of the steps and arrangements according to the invention will now be discussed with the aid of the detailed drawings, considering the peculiarities of the fish species tilapia:

In FIGS. 3A and B is shown the saddle construction required with a view to the above-mentioned thicker region 1 of the main bone. In order to be able to convey the fish through the machine tail first, as is required with the method and apparatus assembly according to the invention, after beheading, slaughtering and making the lower opening cut in the ventral cavity it is mounted head first on an ordinary saddle 21 which is for example also known from DE 29 46 042 B1 and which is provided with a row of transport spikes 22 along its lateral upper edges. These transport spikes are inclined in the opposite direction to the direction of mounting the fish and hence in the direction of subsequent transport thereof, indicated by the arrow 200. Whereas with conventional saddles these rows of spikes on both sides are arranged continuously, with the invention there is an arrangement whereby, seen from the front saddle end 24, first there are two or three spikes and then a gap 23 which receives the thicker main bone portion 115, as can be seen from FIG. 3A, while subsequently additional transport spikes 22 follow. The thicker region 1can be embedded in this gap 23, while the front transport spikes enter the fish body around the vertebral column and fix it. The subsequent spikes then become operative, depending on the length of the fish body 1.

In order that the very rigid anal bone 112, which is also shown in FIG. 3A, cannot result in the fish being pushed away laterally during the required powerful pushing, which would lead to unsatisfactory cutting results and a lower-quality product, the projection 25 of the saddle end 24 is constructed concavely. It can thus receive this anal bone in it or center the fish body 1 by this means.

As can be seen, the sharp teeth 22 inclined in the opposite direction to the direction of mounting the fish in conjunction with a sharpened front edge 26 of the saddle lead to the separating membrane 122, which divides the ventral cavity and demarcates the swim bladder 121, being destroyed in such a way that it no longer forms an obstacle to further processing.

Figure 4A:
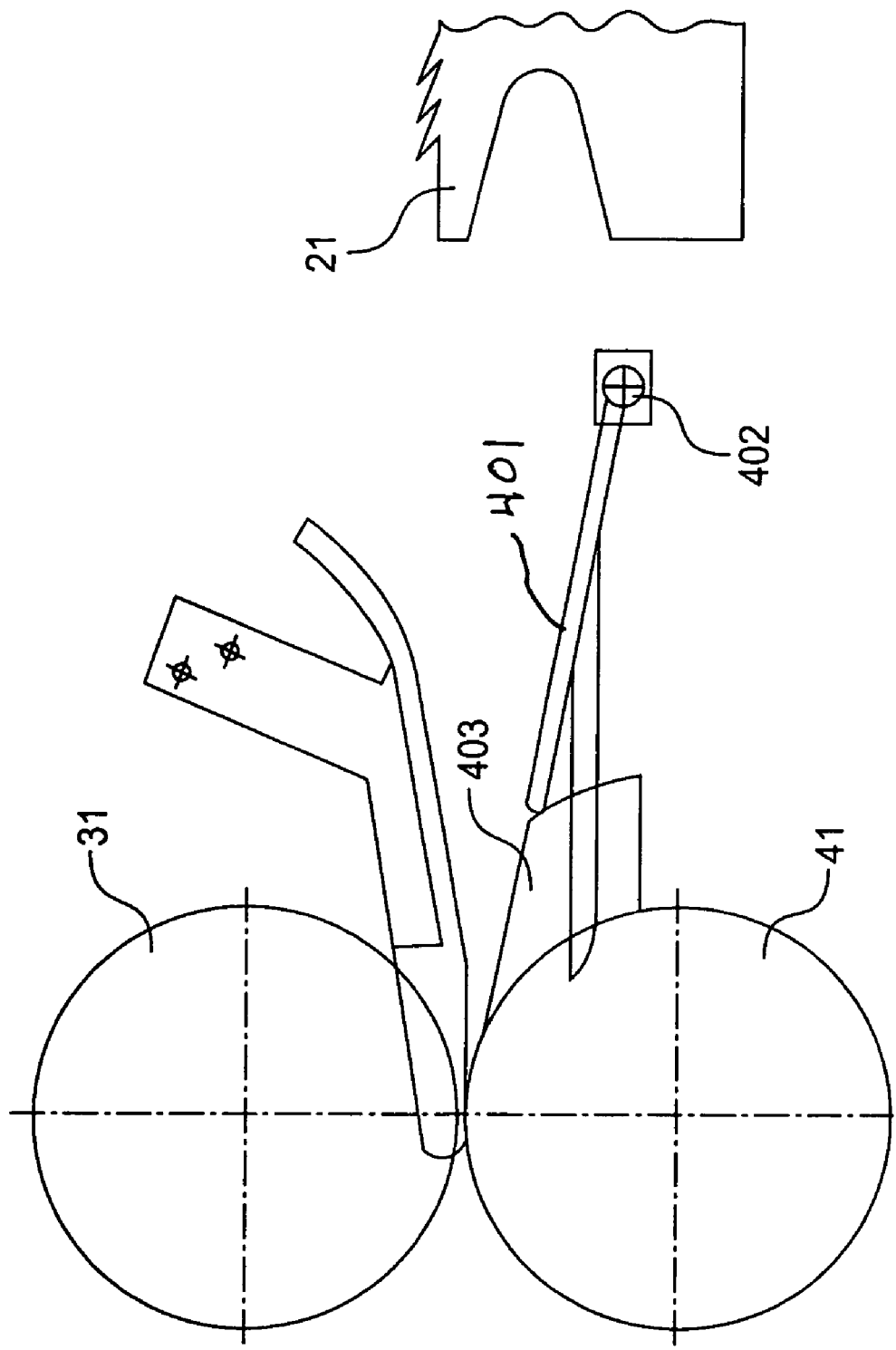
FIG. 4A is side view showing the inlet guide region of the fish approximately in a position relative to the filleting tools indicated by line IV—IV in FIG. 2.
Figure 4B:
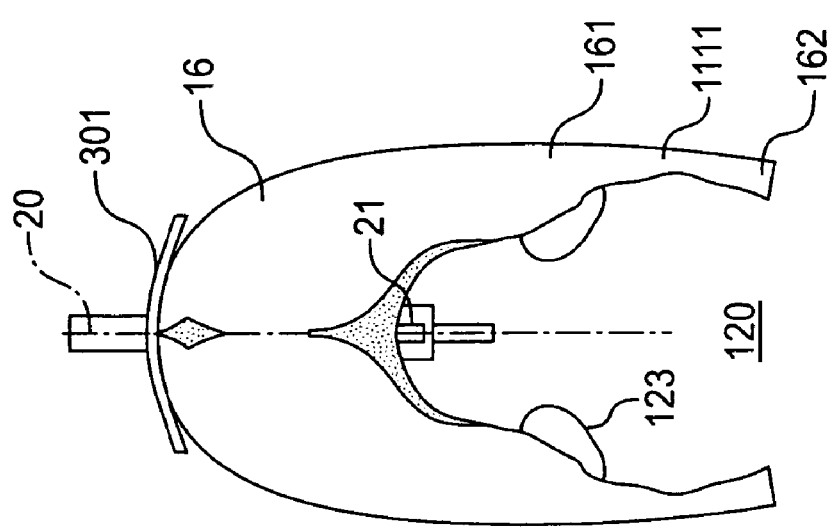
FIG. 4B is a cross-section through the inlet guide of FIG. 4A with the fish inserted

FIGS. 4A and B show the inlet guide region approximately at the level of line IV—IV of FIG. 2. For the purpose of functional control of the hard, very resistant dorsal fins 13 on the one hand and of the equally compact ventral fins 14 a dorsal inlet guide 301 and ventral inlet guide 401 are each provided. The dorsal inlet guide 301 is, as can better be seen from FIG. 4B, constructed as an angle profile. The ventral inlet guide 401, which undertakes insertion of the ventral fin on the tail side, is capable of lateral yielding in two degrees of freedom, namely on the one hand vertically displaceable about the axis 402 extending perpendicularly to the blade plane of FIG. 4A as well as on the other hand with its guide plates 403 which are provided spaced apart on both sides of the path of conveying, yielding laterally perpendicularly to the blade plane and hence to the conveying plane. The conveying plane is shown for order's sake in FIG. 4B, which moreover shows the saddle 21 inside the fish, because this section IV—IV is in the ventral cavity region.

Figure 5:
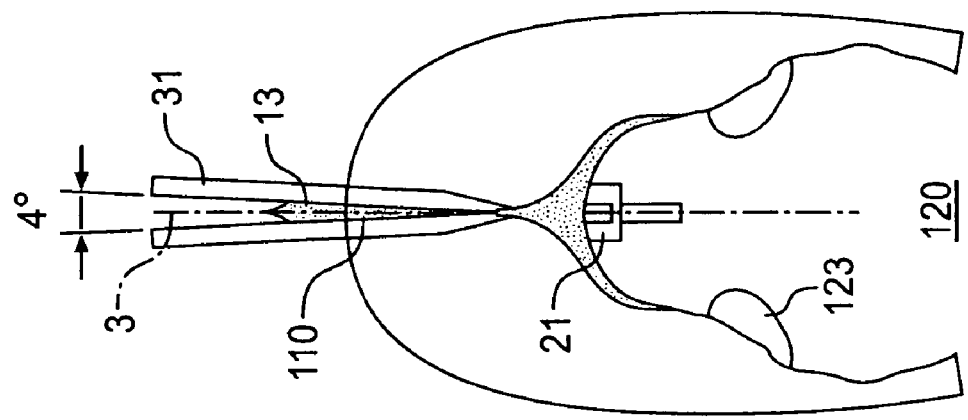
FIG. 5 is a cross-section, showing the dorsal cut at the level of the section plane V of FIG. 2.

FIG. 5 shows a cross-section through the fish at the level of the dorsal tool 3 or the dorsal blades 31, this section being shown in FIG. 2 by the dot and dash line V. The two dorsal blades 31 are set at an angle of 4° to each other so that, as can be seen, they cut under the thick dorsal fin 13 and consequently leave optimum flesh on the fillet 16 by cutting close to the vertebral column 110.

The section through the fish according to FIG. 6A, made along the line VI—VI of FIG. 2, shows trimming of the ventral lobes 161 by means of the trimming tool 6 in the form of a pair of trimming blades 61. In section, a trimming cut support 62 shown in the top view is omitted here. It can be seen that the trimming blades 61 separate the lower ventral lobe ends 162 in the lower portion of the ventral lobes 161 where the flank or rib bones 111 end and practically make a connection with the outer skin of the fish, wherein the cutting supports 62 cooperate with the blade edges from the inside, that is, from the ventral cavity 120. A blade cover 63 ensures that at the end of the trimming cut the fillet is lifted over the trimming blades 61, so that the latter cannot cut into the fillet and no valuable fillet flesh is lost.

Figure 7:
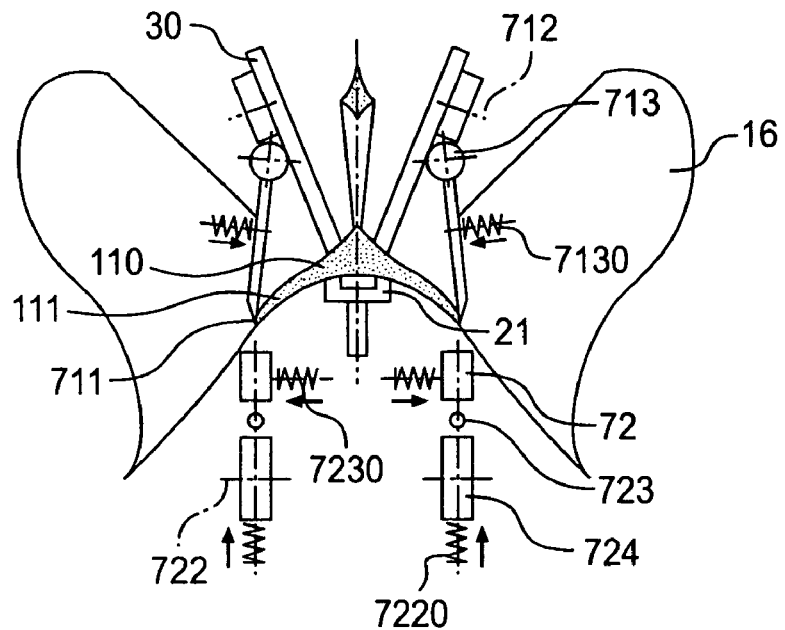
FIG. 7 is a cross-section through the fish at the level of the section plane VII—VII of FIG. 2 at the level of the peeling or scraping device.

FIG. 7 shows in detail the scraping tool 7 in a section approximately along line VII—VII. Guided by dorsal guides from above to engage the spine and by means of the saddle 21 from below to engage the spine 110, the fish cut free in the fillets from the ventral bone/ventral spokes as well as from the dorsal bone/dorsal spokes and around the spine moves into the region of the tips of the peeling blades 71 which peel the fillet flesh free from above, beginning at the vertebral processes of the vertebral column 110, on account of their diverging construction—as already described in DE 29 46 042 B1—along the upper edges of the flank bones or ribs 111. This takes place in cooperation with the peeling blade supports 72 by the fact that the ribs are moved through the gap between the peeling edges 711 of the peeling blades 71 and the upper edges of the peeling blade supports 72, which gap is variable in width against spring force, depending on the thickness of the bones. To ensure precise lifting over the protuberances 123, which are not shown here for reasons of simplification, and so prevent portions of the fillets being somehow cut into in this region, the peeling blades 71 like the peeling blade supports 72 are mounted so as to be laterally pivotable in addition to their (usual) vertical displacement capacity. For vertical pivotability the peeling blades 71 are vertically pivotable about pivot axes 712 which run essentially perpendicularly to the conveying plane and are slightly at an angle here, while the cutting supports 72 are mounted to be vertically displaceable about corresponding support pivot axes 722. This vertical pivotability is effected against the force of corresponding springs, of which those for the peeling blades 71 are omitted here, while for the supports 72 springs 7220 ensure the required support pressure. The lateral pivotability, that is, lateral yielding of the peeling blades 71 and supports 72, is provided by mounting these tool portions on hinge axes 713 or 723, wherein this too is guaranteed with lateral spring yielding by means of corresponding compression springs 7130 or 7230.

As an advantageous variant from the above-described procedure of trimming the ventral lobes 161 before subsequent separation of the fillets with corresponding arrangement of the trimming device 6 in front of the scraping tool 7, FIG. 8 shows an arrangement particularly suitable for tilapia fish with extremely tough skin, in which the trimming device 6 is mounted directly within the operating or working region of the scraping tool 7. With such an arrangement, the fish cut free in the fillets from the ventral bone/ventral spokes as well as from the dorsal bone/dorsal spokes and around the spine first moves into the region of the tips of the peeling blades 71. Actual scraping or separation takes place in cooperation with the peeling blade supports 72. The fillet flesh is therefore peeled free along the upper edges of the flank bones or ribs 111. Only after peeling free the fillet, at least up to the cut-open point of the trimming cut, are the ventral lobes 161 trimmed so that the initial cut of peeling separation is before the initial cut for trimming in time. Due to the fact that the fish first moves into the region of the scraping tool 7, the ribs are peeled free from the fillets until the initial cut of the trimming tool, whereupon only then does trimming take place, this being in such a way that the trimming blade 6 performs a separating cut from below as far as the outer skin. An additional cutting support is not necessary here as long as the trimming blade, as can be seen, is located in the region of the scraping tool 7 which ensures the necessary counterpressure. Further processing takes place in the same manner already described above, but with the difference that the ventral lobe portions, joined to the fillets by the skin, are entrained with them until e.g. a subsequent skinning operation ensures final separation.

To achieve easy changing in position of the trimming tool, that is, to be able to adapt the apparatus in general to quickly varying fish sizes, it is easy either to provide several exchange positions for mounting the trimming device on the machine or to mount the trimming device on a bearing rail or the like on which it is easily and infinitely variably slidable and can be fixed. In this case naturally allowance can also be made for different angles of inclination for the trimming tool which, as can be seen in the drawings, should be mounted essentially at an angle to the (imaginary) conveying plane in FIG. 6 for cutting from the outside, whereas according to FIG. 8 it can lie with its blade plane practically parallel to this conveying plane for cutting from the inside.

To facilitate the peeling or scraping operation with adaptation to the harder surfaces of the bones without risk of cutting into them, as is known for example from chamferfree razor blades, the scraping blades 71 are provided at their inner or lower edge regions facing towards the bones with inner or lower chamfers, which however are not shown in more detail here.

Further details of the arrangement according to the invention, which is however shown only by way of example, can be dispensed with because its principle of operation can be seen from the drawings. It should only be pointed out that for design reasons e.g. the peeling cut supports 72 are constructed in two parts and the actual support 72 is seated on a support 724, so that the latter is subjected to the spring pressure of the compression spring 7220 and so the actual support 72 is not impeded in its operation by additional ventral portions, i.e. enough space is available for peeling or scraping the fish. Also the pivot shaft 712 can be mounted fixed to the machine on a bearing block; hence it does not absolutely have to be seated on the dorsal guide 30, as done here for reasons of appropriateness.

The invention claimed is:

1. In a method for filleting fish which have been beheaded, slaughtered and had their ventral cavity opened during large-scale processing of certain farmed and/or breeding fish of the tilapia species, wherein fillets are detached from the bone structure by means of:
   a) dorsal cuts made in a dorsal region as far as a vertebral column and exposing dorsal spokes;
   b) ventral cuts made on a ventral side in a caudal region as far as the vertebral column and exposing ventral spokes;
   c) separating cuts made over the vertebral column and connecting the dorsal and ventral cuts; and d) peeling separation which under laterally yielding counterpressure is effected from the vertebral column along ribs surrounding a ventral cavity; the improvement which comprises:

e) peeling separation by peeling cuts adapted to the rib contour and made with at least two degrees of freedom; and f) then trimming ventral lobes by separation of ends of their ventral lobe portions projecting beyond the ribs.

2. The method according to claim 1, which further comprises trimming effected after lifting the ventral lobes under a cutting support by separation of inner ventral skin as far as an end of the ribs at their point of connection to an outer skin.

3. The method according to claim 1, wherein peeling is effected at an angle of ≦10° to the plane of conveyance of the fish.

4. In an apparatus for filleting fish which have been beheaded, slaughtered and had their ventral cavity opened during large-scale processing of breeding fish of the tilapia species, wherein the apparatus includes:

a) dorsal blades for exposing dorsal spokes up to a vertebral column;

b) ventral blades for exposing ventral spokes in a caudal region up to the vertebral column;

c) separating blades for separating fillets in the caudal region from the vertebral column, cutting through a ridge left by ventral and dorsal blades around the vertebral column;

d) a scraping tool including peeling blades and peeling blade supports for peeling separation of the fillets from ribs surrounding a ventral cavity under laterally yielding counterpressure from the vertebral column;

e) an endless conveyor for transport of a fish tail first and past the tools according to a) to d) arranged on both sides of an imaginary conveying plane; and f) a plurality of fish saddles arranged on the conveyor for reliably holding the fish in their ventral cavity for the purpose of transport and processing with the tools; the improvement which comprises:

g) the scraping tool is both pivotable with lateral spring yielding about an axis running essentially perpendicularly to a conveying plane and pivotable away from the conveying plane against spring force about a hinge axis running essentially in the direction of peeling edges of the scraping tool; and h) a trimming device, which is arranged in the region of the scraping tool, for trimming ventral lobes in a region of a ventral cavity by separation of their ventral lobe portions projecting beyond the ribs.

5. The apparatus according to claim 4, wherein the trimming device includes a pair of circular trimming blades.

6. The apparatus according to claim 5, wherein the trimming device additionally includes a cutting support associated with each of the circular trimming blades.

7. An apparatus according to claim 4, wherein the peeling blades are designed as scraping blades arranged in pairs on both sides of the conveying plane with a scraping angle of ≦10° to the conveying plane and peeling blade supports, at least in the input region, are provided with a slender, slightly widened upper edge, and wherein cutting edges of the scraping blades project beyond the supports.

8. An apparatus according to claim 7, wherein the peeling blades are provided with an inner or lower chamfer.

9. An apparatus according to claim 4, in which the fish saddles of the conveyor are provided with a plurality of transport spikes which ensure reliable seating of the ventral cavity and at least partially penetrate the fish structure, wherein from a front saddle end there are provided initially two to three transport spikes which are followed by a gap roughly corresponding to a spike division step and then, following on behind, additional spikes.

10. Apparatus according to claim 4, wherein the saddles are each constructed with a slightly concave projection.

11. Apparatus according to claim 4, which includes at least one dorsal inlet guide for guiding a dorsal fin in sliding relationship in a fish input region, wherein the dorsal inlet guide is provided as a closed angle profile.

12. An apparatus according to claim 4, which includes ventral inlet guides for introducing a ventral region of the fish into filleting blades on the ventral side, wherein the ventral inlet guide is double-mounted and designed for lateral yielding in two degrees of freedom.

13. An apparatus according to claim 4, wherein the dorsal blades are arranged in pairs and form between them an angle of 2 to 6°.

14. Apparatus according to claim 13, wherein the dorsal blades form between them an angle of essentially 4°.

15. An apparatus according to claim 4, wherein the saddles are each constructed with a sharp front edge.

* * * * *